(12) United States Patent
Fabian

(10) Patent No.: US 6,938,443 B1
(45) Date of Patent: Sep. 6, 2005

(54) METHOD FOR THE MANUFACTURE OF A QUARTZ GLASS PREFORM FOR AN OPTICAL FIBER

(75) Inventor: Heinz Fabian, Grossostheim (DE)

(73) Assignee: Heraeus Tenevo GmbH, Hanau (DE)

( * ) Notice: Subject to any disclaimer, the term of this patent is extended or adjusted under 35 U.S.C. 154(b) by 433 days.

(21) Appl. No.: 10/148,817

(22) PCT Filed: Nov. 27, 2000

(86) PCT No.: PCT/EP00/11807

§ 371 (c)(1),
(2), (4) Date: Jun. 3, 2002

(87) PCT Pub. No.: WO01/40126

PCT Pub. Date: Jun. 7, 2001

(30) Foreign Application Priority Data

Dec. 3, 1999 (DE) .................... 199 58 276

(51) Int. Cl.[7] .................... C03B 37/025; C03B 37/01
(52) U.S. Cl. .................... 65/412; 65/419; 65/428
(58) Field of Search .................... 65/412, 419, 428

(56) References Cited

U.S. PATENT DOCUMENTS

| 4,251,251 A | * | 2/1981 | Blankenship | 65/422 |
| 4,264,347 A | * | 4/1981 | Shintani et al. | 65/412 |
| 4,737,179 A | * | 4/1988 | Tanaka et al. | 65/415 |
| 4,749,396 A | * | 6/1988 | Hicks, Jr. | 65/412 |
| 4,775,401 A | * | 10/1988 | Fleming et al. | 65/395 |
| 5,090,980 A | * | 2/1992 | Clasen | 65/391 |
| 5,106,402 A | * | 4/1992 | Geittner et al. | 65/391 |
| 5,917,109 A | * | 6/1999 | Berkey | 65/412 |

FOREIGN PATENT DOCUMENTS

| EP | 392599 A | * | 10/1990 | ............ C03B 8/00 |
| EP | 1000909 B1 | * | 7/2003 | ............ C03B 19/14 |
| JP | 06329430 A | * | 11/1994 | ......... C03B 37/012 |

OTHER PUBLICATIONS

Electro-Optics Handbook, copyright 2000, Mc-Graw Hill, p. 12.11, figure 12.12. Reference for Figure 12.12 from S. Yoshida, Kougaku Gijutsu Contact, vol. 24, pp. 681-691, 1986.*

* cited by examiner

*Primary Examiner*—Steven P. Griffin
*Assistant Examiner*—Lisa Herring
(74) *Attorney, Agent, or Firm*—Tiajoloff & Kelly

(57) ABSTRACT

The invention relates to a method for manufacture of a quartz glass preform for an optical fibre consisting of the following steps: preparation of a hollow cylinder made of porous quartz glass which exhibits an inner layer with a doping substance which increases the refractive index of quartz glass and an outer layer surrounding the inner layer, with a lower refractive index, and collapse of the hollow cylinder characterised by collapse of the porous hollow cylinder onto a quartz glass rod containing the doping substance.

10 Claims, 1 Drawing Sheet

METHOD FOR THE MANUFACTURE OF A QUARTZ GLASS PREFORM FOR AN OPTICAL FIBER

Figure 1:
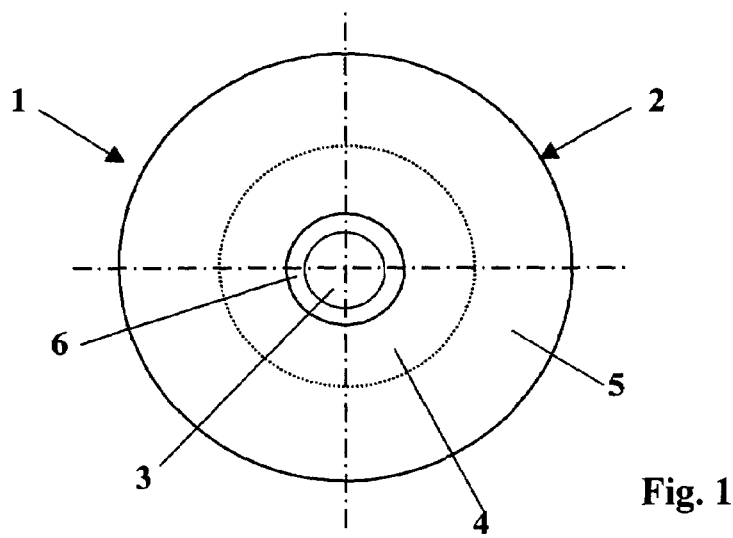

This invention relates to a method for the manufacture of a quartz glass preform for an optical fibre, comprising the following method steps: providing a hollow cylinder of porous quartz glass having an inner layer with a doping substance increasing the refractive index of quartz glass and having an outer layer of a lower refractive index surrounding the inner layer, and collapsing the hollow cylinder.

Moreover, this invention concerns a quartz glass preform for optical fibres, comprising a core of quartz glass with a doping substance increasing the refractive index of quartz glass, and a quartz glass jacket of a lower refractive index enveloping the core.

U.S. Pat. No. 4,251,251 describes the manufacture of a quartz glass preform for an optical fibre according to the OVD method. In a first method step, a porous $SiO_2$ cylinder ("soot cylinder") is made which consists of an $SiO_2$ inner layer doped with germanium oxide (25% by weight) and boric oxide (5% by weight); said layer being surrounded by a $SiO_2$ outer layer doped with boric oxide (2% by weight). The soot cylinder is formed by flame hydrolysis of $SiCl_4$ (or, respectively, of $GeCl_4$ and $BCl_3$). In a second method step, the $SiO_2$ outer layer is deposited on an $SiO_2$ inner layer. Subsequently, the quartz glass mandrel is retracted from the soot cylinder. The soot cylinder thus has a bore whose inside diameter is equivalent to the mandrel's outside diameter. The preform is obtained from the soot cylinder by sintering the porous soot cylinder and simultaneously collapsing the bore. The preform has a core made of quartz glass doped with boric oxide and germanium dioxide, whose refractive index is 1.476, and which is surrounded by a quartz glass jacket whose refractive index is 1.457.

The effectiveness of $SiO_2$ deposition depends on the mandrel's outside diameter. With a larger mandrel outside diameter, a correspondingly larger initial surface is provided so that $SiO_2$ deposition will be more effective. On the other hand, with a larger outside diameter of the mandrel, the soot cylinder's bore will become correspondingly larger. The wider a bore is, the more difficult it is to close during sintering and collapsing. It is known that core areas of oval cross section may develop when closing large bores, especially when low pressure is additionally applied in the bore. The problem of closing the bore will be even more aggravated with doped quartz glass because the doping substances may diffuse from the inner layer—due to the long heating phases and high temperatures during sintering and collapsing—and thus an area of the inner layer will develop which is impoverished of doping substances, that area having a smaller refractive index as a rule. This area of the preform (or, respectively, the optical fibre made thereof) is called "dip" in the literature.

Therefore, this invention is based on the object to specify an effective method for the manufacture of a quartz glass preform for optical fibres wherein the method step of closing the bore of a porous quartz glass hollow cylinder is facilitated, and of providing a low-cost preform manufactured according to the method.

With regard to the method, this object is achieved, under the invention, on the basis of the process described above, by collapsing the porous hollow cylinder onto a quartz glass rod containing the doping substance.

The porous hollow cylinder is collapsed onto a quartz glass rod containing the doping substance, which is introduced, before collapse, into the bore of the porous hollow cylinder, such that upon collapse only the gap between the hollow cylinder and the quartz glass rod has to be closed. Accordingly, the gap to be closed becomes less, such that the deformation of the hollow cylinder required for closing of the gap is less than would be necessary for collapse of the entire bore aperture. Under the process as per the invention, then, the duration of the collapse phase is shorter and/or the collapse temperature is lower, and thus the thermal loading of the hollow cylinder is less, overall, than in the known process. Because of the comparatively low deformation of the hollow cylinder upon collapse, furthermore, it is made easier to adhere to a preset geometry and dimensions in respect of the quartz glass cylinder made from the quartz glass rod and collapsed hollow cylinder.

A further distinction in the process as per the invention is that the porous hollow cylinder exhibits an inner layer with a doping substance which increases the refractive index of quartz glass, and an outer layer surrounding the inner layer, with a lower refractive index. The hollow cylinder is collapsed onto a quartz glass rod, which contains the same doping substance as the quartz glass on the inner layer of the hollow cylinder. Under the process as per the invention, not only does this provide the inner layer of the hollow cylinder, but also the quartz glass rod provides a part of the "core" of the preform. This simplifies the manufacture of the core, which is most conspicuous with a large-volume preform with a correspondingly large core. Furthermore, the hollow cylinder provides the jacket ("optical cladding" of the optical fibre) or a part of it. The porous hollow cylinder is so called "silica soot cylinder" made of fumed silica.

The doping substance can be restricted to the area of the inner layer. In the event that the doping substance is distributed consistently over the entire wall thickness of the hollow cylinder, the lower refractive index in the area of the outer layer is set up by an additional doping substance which reduces the refractive index of quartz glass.

In addition to the proposed measures for production of a preform under the invention, in accordance with the concrete specification and its specified utilisation, further process steps are required in order to manufacture the preform. In particular, it is possible for the collapsed hollow cylinder also to be surrounded with one or several quartz glass jacket layers.

It has been found to be particularly advantageous if the quartz glass rod and the inner layer contain doping substance in approximately equal concentration, provided that the difference in refractive index between the quartz glass rod and the inner layer does not exceed a maximum of 0.001. Consistent doping of the inner layer and the quartz glass rod produces the same viscosity in the respective quartz glass. This makes it easier to configure a satisfactory contact area between the quartz glass rod and the inner layer upon collapse.

Particular preference is given to a process in which a quartz glass rod with a radially homogenous refractive index distribution and with a refractive index at least 0.003 higher than undoped quartz glass is employed. Doping substances which increase the refractive index of quartz glass generally bring about a reduction in the viscosity of quartz glass. Lower viscosity facilitates the closing of the gap between the hollow cylinder and the quartz glass rod, and also the configuration of a satisfactory contact area between the quartz glass rod and the inner layer, upon collapse. The advantages of this step become particularly conspicuous in the case of large-volume preforms which exhibit a core with a large diameter and a constant refractive index distribution.

In the process as per the invention, not only the inner layer of the hollow cylinder but also the quartz glass rod contribute to the core.

In this respect, furthermore, it has been found advantageous to employ germanium dioxide as the doping substance, in which context the germanium dioxide content of the quartz glass rod is at least 3% by weight. The germanium dioxide has the effect of lowering the viscosity of quartz glass and increasing its refractive index. Reference has been made above to the advantages of lower viscosity with regard to closing the bore.

It has also been found advantageous that the porous hollow cylinder contains fluorine. Fluorine doping reduces the viscosity of quartz glass and brings about a reduction in the refractive index. To that extent, fluorine doping also facilitates closing of the gap between the hollow cylinder and the quartz glass rod, and the formation of a satisfactory contact area between the quartz glass rod and the inner layer, upon collapse. The fluorine content can bring about local reduction of in the refractive index in the outer layer of the hollow cylinder; however, it may also be constant over the wall thickness of the hollow cylinder. Doping with fluorine and with a doping substance which raises the refractive index of quartz glass, such as germanium dioxide, will bring about a particularly low viscosity in quartz glass, in which context the repercussions of the two doping substances may compensate each other in whole or in part with regard to the refractive index. The quartz glass of the quartz glass rod may also contain fluorine.

A further improvement is obtained if the porous hollow cylinder is subjected to chlorine treatment by heating in a chlorinaceous atmosphere at a temperature above 700 degrees centigrade. The chlorine treatment brings about a removal of impurities, and the OH content and the viscosity of the quartz glass are reduced. This facilitates collapse and a particularly satisfactory contact surface between the hollow cylinder and the quartz glass rod are obtained.

Ideally, the external diameter of the quartz glass rod and the internal diameter of the porous hollow cylinder are selected such that during chlorine treatment an annular gap remains between the porous hollow cylinder and the quartz glass rod inserted into it. Chlorine treatment is performed after insertion of the quartz glass rod into the hollow cylinder and before sintering and collapse of the hollow cylinder. This brings about cleaning of the surface areas demarcated in the annular gap, which configure the contact area after collapse.

Preference is given to utilisation of a quartz glass rod which exhibits an outer diameter of 5 mm or less. The thinner the quartz glass rod, the less the contact area between the hollow cylinder and the quartz glass rod after collapse, and the lower the number of points of disruption in the area of the contact surface. In order to produce a preform with a core of consistent refractive index distribution, it is particularly advantageous, specifically in such a thin quartz glass rod, if the inner layer of the hollow cylinder exhibits the same doping as the hollow cylinder itself.

Ideally, the quartz glass rod is manufactured according to the VAD (Vapour Axial Deposition) method. This method can be used at particularly low-cost and with good effect for manufacture of a consistently doped quartz glass rod.

A further improvement with regard to the effectiveness of preform manufacture is obtained if the quartz glass rod is obtained by stretching of a rod preform. For this purpose, initially a rod preform is made, ideally by the VAD process, whose outer diameter is greater than the theoretical diameter of the quartz glass rod. The theoretical diameter can be precisely set by stretching of such a rod preform, and furthermore, the rod's surface is moved during stretching. Stretching of a rod preform with a high external diameter makes it possible to achieve a multiple of its length for production of 1 or several quartz glass rods.

Production of the preform generally comprises an additional process step in which the core rod obtained by collapse of the hollow cylinder onto the quartz glass rod is flashed with a flash tube (jacket tube) made of quartz glass.

With regard to the preform, the above-mentioned objective is achieved under the invention in that the core is made from a quartz glass rod and in that a hollow cylinder which surrounds the quartz glass rod, is made of porous quartz glass, is sintered and collapsed during sintering onto the quartz glass rod, and which surrounds at least one section of the jacket.

For production of the preform, the porous hollow cylinder is collapsed onto a quartz glass rod containing the same doping substance, which is inserted into the bore of the porous hollow cylinder before collapse. Thus, the porous hollow cylinder represents a component of the preform core. Furthermore, at least a part of the jacket ("optical cladding") of the preform originates from the collapsed, porous hollow cylinder. With regard to the resultant advantages, with particular reference to an increase in the effectiveness of preform manufacture, reference is made to the explanatory notes for the process as per the invention.

In addition to the quartz glass rod and the hollow cylinder collapsed onto it, the preform as per the invention may, depending on the intended purpose or specification, comprise further quartz glass layers. In particular, the merit of a quartz glass preform which exhibits a quartz glass layer surrounding the core and the jacket, and which is produced by collapse of a flash tube (jacket tube) made of quartz glass, has been proven.

Figure 2:
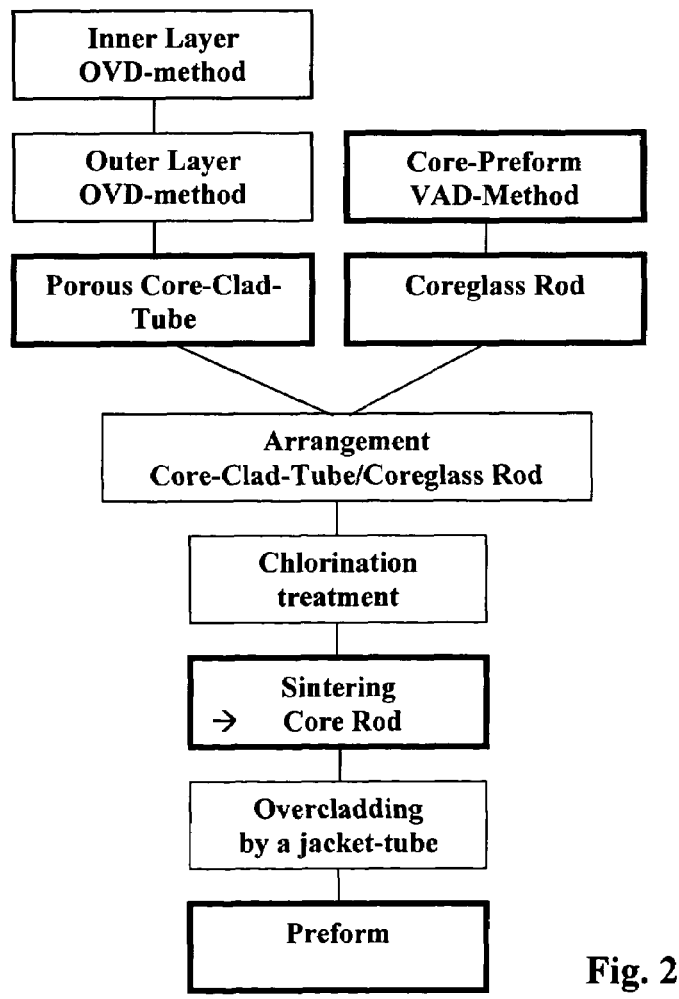

Below, the invention is explained in greater detail on the basis of a specification example and a drawing. In detail, the diagrams in the drawing material illustrate:

FIG. 1 an arrangement of the core jacket tube made of porous quartz glass and the quartz glass core rod before collapsing to a core rod in a radial section, and FIG. 2 an embodiment for production of a preform on the basis of a flowchart with individual method steps.

In FIG. 1, reference number 1 refers overall to a coaxial arrangement of a core jacket tube 2 and a core glass rod 3. Core glass rod 3 consists of quartz glass which is homogeneously doped with 5 mm percentage weight of germanium dioxide. The diameter of core glass rod 3 is 3 mm.

Core jacket tube 2 consists of a porous quartz glass hollow cylinder (soot body). In an inner section 4, core jacket tube 2 is homogenously doped with germanium dioxide, where the nominal concentration of germanium dioxide is consistent with that of core glass rod 3. In an outer section 5, core of jacket tube 2 consists of undoped, porous quartz glass. The bore diameter of core jacket tube 2 is 5 mm, such that in the coaxial arrangement 1 between the wall of the bore and core glass rod 3 there remains an annular gap 6 with a gap width of 1 mm. The outer diameter of core jacket tube 2, in the specification example, is 35 mm, and the demarcating surface between inner section 4 and outer section 5 is at a diameter of approximately 9 mm.

Below, on the basis of FIG. 2, the method steps for manufacture of the arrangement shown in FIG. 1, of core jacket tube 2 and core glass rod 3 and further process steps for manufacture of a core rod and of a preform are explained by way of example, in which context recourse is had to the reference numbers used in FIG. 1 for designation of identical or equivalent sections of the preform.

For purposes of implementation of the method as per the invention, a core glass rod 3 and a porous core jacket 2 are provided. Core jacket tube 2 is produced by flame hydrolysis of $SiCl_4$ and external deposition of $SiO_2$ articles on the jacket surface of a mandrel rotating about its own longitudinal axis (OVD process). An aluminium oxide tube of 5 mm diameter is employed as the mandrel. Using a deposition burner, in the first instance inner layer 4 is deposited, in which context not only $SiCl_4$ but also $GeCl_4$ is applied in order to acquire the above-mentioned concentration of doping substance for inner layer 4. Next, the supply of $GeCl_4$ is stopped and outer layer 5 is deposited on inner layer 4 according to the same process. Core jacket tube 2 which is obtained after removal of the mandrel consists of porous quartz glass.

For purposes of production of core glass rod 3, in the first instance a rod preform is produced by flame hydrolysis of $SiCl_4$ and $GeCl_4$ with the formation of $SiO_2$ articles and axial deposition of $SiO_2$ articles on a rotating substrate (VAD process). The correspondingly produced rod has a diameter of approximately 40 mm. By an extension process, the rod is lengthened to a diameter of 3 mm and extends adequately to produce a large number of core rods.

For production of the preform as per the invention, core glass rod 3 is fixed coaxially in the axial bore of core jacket tube 2 together with formation of arrangement 1 as illustrated in FIG. 1. Arrangement 1 is subjected to a chlorine treatment at a temperature of approximately 1000 degrees Centigrade in order to purify the surfaces adjacent to annular gap 6. Next, porous core jacket tube 2 is fused onto core glass rod 3, in which context the arrangement is heated to a temperature of 1400 degrees Centigrade in a furnace. The annular gap 6 can be closed satisfactorily by heating, in zones, of the vertically oriented arrangement 1. The contact surface between the original core glass rod 3 and inner layer 4 of core jacket tube 2 cannot be detected with the naked eye.

The correspondingly obtained core rod represents the fibre core of the subsequently produced optical fibre and the jacket which contributes to the function of lightwave guidance ("optical cladding"). It acquires a quartz glass core which is homogenously doped with germanium dioxide, with an external diameter of 8.8 mm and a refractive index which is 0.005 above the refractive index of undoped quartz glass. The central section of this core is formed by the original core glass rod 3, and the outer section of inner layer 4 of the original core jacket tube 2. The difference in the refractive index of the central section and of the outer section of the core is approximately 0.0001. The core is surrounded by an undoped quartz glass jacket with a refractive index of 1.4585. The jacket is formed by outer layer 5 of the original core jacket 2.

For production of the preform, the core rod is rounded down into the desired external dimensions, flame polished and flashed with a flash tube made of undoped quartz glass (the "jacket tube"). Thereafter, the preform will exhibit an external diameter of 130 mm.

What is claimed is:

1. A method for the manufacture of a quartz glass preform for an optical fiber, comprising the following method steps:
   providing a hollow cylinder of porous quartz glass having an inner layer with a doping substance increasing the refractive index of quartz glass, and an outer layer having a lower refractive index than the inner layer and enveloping the inner layer; and
   collapsing the hollow cylinder, wherein the porous hollow cylinder is collapsed onto a quartz glass rod containing the doping substance, and,
   wherein said quartz glass rod and inner layer contain the doping substance in approximately identical concentrations, and the difference of refractive indices of the quartz glass rod and the inner layer is 0.001 maximum.

2. A method according to claim 1, wherein said quartz glass rod has a radially homogeneous refractive index profile and a refractive index higher by at least 0.003 than undoped quartz glass.

3. A method according to claim 1, wherein the doping substance is germanium dioxide and that the germanium dioxide concentration of the quartz glass rod is at least 3% by weight.

4. A method according to claim 1, wherein the porous hollow cylinder contains fluorine.

5. A method according to claim 1, wherein the porous hollow cylinder is subjected to a chlorine treatment by heating it in a chlorine containing atmosphere at a temperature above 700° C.

6. A method according to claim 5, wherein the outside diameter of the quartz glass rod and the inside diameter of the porous hollow cylinder are selected such that an annular gap between the porous hollow cylinder and the quartz glass rod inserted therein will remain during the chlorine treatment.

7. A method according to claim 1, wherein the quartz glass rod has an outside diameter of 5 mm or less.

8. A method according to claim 1, wherein the quartz glass rod is manufactured according to the VAD method.

9. A method according to claim 1, wherein the quartz glass rod is obtained by stretching a rod preform.

10. A method according to claim 1, wherein a core rod is obtained by collapsing the hollow cylinder onto the quartz glass rod, the core rod being jacketed with a jacket tube of quartz glass.

* * * * *